United States Patent
Johnson

(10) Patent No.: US 9,994,293 B2
(45) Date of Patent: Jun. 12, 2018

(54) KAYAK PADDLE AND ACCESSORY MOUNTING SYSTEM

(71) Applicant: Timothy Johnson, St. Marys, PA (US)

(72) Inventor: Timothy Johnson, St. Marys, PA (US)

(*) Notice: Subject to any disclaimer, the term of this patent is extended or adjusted under 35 U.S.C. 154(b) by 380 days.

(21) Appl. No.: 14/798,711

(22) Filed: Jul. 14, 2015

(65) Prior Publication Data

US 2017/0015392 A1    Jan. 19, 2017

(51) Int. Cl.
*B63B 35/00* (2006.01)
*A01K 97/10* (2006.01)
*B63H 16/04* (2006.01)
*B63B 35/71* (2006.01)

(52) U.S. Cl.
CPC ............ *B63H 16/04* (2013.01); *A01K 97/10* (2013.01); *B63B 2035/715* (2013.01)

(58) Field of Classification Search
CPC ..................... A01K 97/10; B63B 2035/715
USPC ......... 224/406, 550–551, 403–405, 542, 500
See application file for complete search history.

(56) References Cited

U.S. PATENT DOCUMENTS

| | | | | |
|---|---|---|---|---|
| 2,734,555 A * | 2/1956 | Kroner | ............. | A01K 97/22 114/363 |
| 5,901,890 A * | 5/1999 | Stokes | ............. | A01K 97/10 114/343 |
| 6,755,145 B2 * | 6/2004 | Bolebruch | ............. | B63B 25/002 114/347 |
| 7,146,927 B1 * | 12/2006 | Wright | ............. | A01K 97/06 114/347 |
| 9,586,657 B1 * | 3/2017 | Dykes | ............. | A01K 97/10 |

* cited by examiner

*Primary Examiner* — Justin Larson

(57) ABSTRACT

A kayak paddle and accessory mounting system is a system for securely holding a kayak paddle and various accessories on a kayak. The system is mounted and elevated over the kayak cockpit in order to allow for the use of a spray skirt in conjunction with the present invention. A fore width adjustable support assembly and an aft width adjustable support assembly allow the system to be adjusted to accommodate various sizes and designs of kayaks and additionally serve to offset an accessory tray over the kayak cockpit. An at least one paddle holder clip and an at least one accessory holder allow for the mounting of a kayak paddle and an accessory such as a fishing net. The accessory tray may be closed via a lid in order to more securely hold accessories and personal belongings.

18 Claims, 10 Drawing Sheets

KAYAK PADDLE AND ACCESSORY MOUNTING SYSTEM

FIELD OF THE INVENTION

The present invention relates generally to a device for securing various accessories to a kayak. More specifically, the present invention is a kayak paddle and accessory mounting system that allows the user to mount a paddle and various accessories to a kayak without compromising the ability to use a kayak spray skirt.

BACKGROUND OF THE INVENTION

Kayaks are available in many forms and are utilized for a correspondingly wide variety of recreational purposes. When utilizing a kayak in a body of water, one may wish to engage in other activities such as, but not limited to, fishing. However, the design of conventional kayaks presents numerous inconveniences and difficulties. For example, when fishing, one must secure the kayak paddle, fishing pole, tackle box, and additional miscellaneous accessories on or within the kayak. Because one remains seated within the kayak, there is generally very little space to place the kayak paddle and accessories when fishing. Mounting systems for kayak paddles, fishing poles, and accessories do exist, although there are several inherent shortcomings to these existing systems. One such shortcoming is the difficulty or impossibility of utilizing a spray skirt in conjunction with a mounting system. These mounting systems typically mount directly to the rim of the kayak cockpit, preventing the use of a spray skirt as a spray skirt must be secured to the rim in order to be effective. The present invention seeks to provide the user with a means of securely mounting a kayak paddle as well as additional accessories to a kayak without compromising the ability to utilize a spray skirt as well.

The present invention is a kayak paddle and accessory mounting system for safely and securely mounting a kayak paddle in place while the user engages in other activities. The present invention additionally provides the user with a means of stowing and securing various other accessories including, but not limited to, fishing poles and tackle boxes. The present invention is mounted to the kayak body and is offset from the cockpit rim to allow a spray skirt to be normally mounted to the cockpit rim.

DETAIL DESCRIPTIONS OF THE INVENTION

Figure 1:
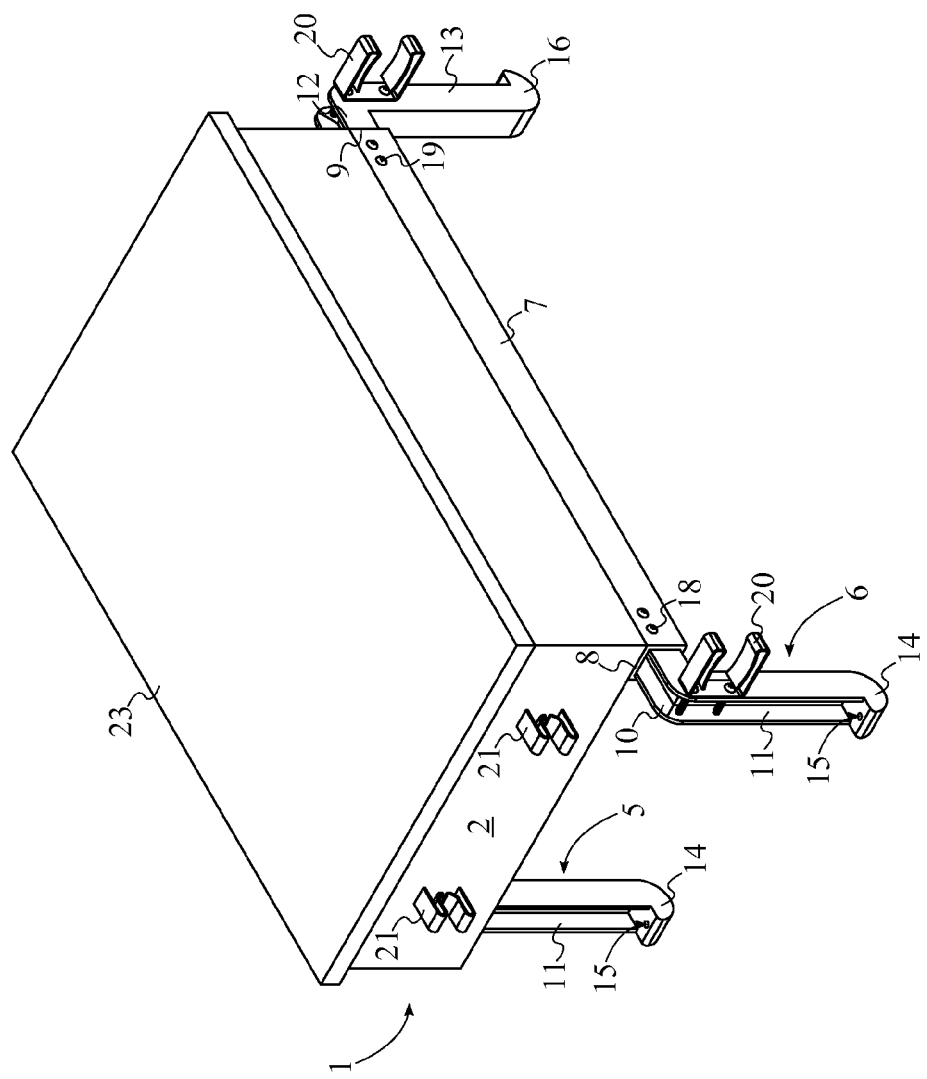
FIG. 1 is a top perspective view of the present invention.
Figure 2:
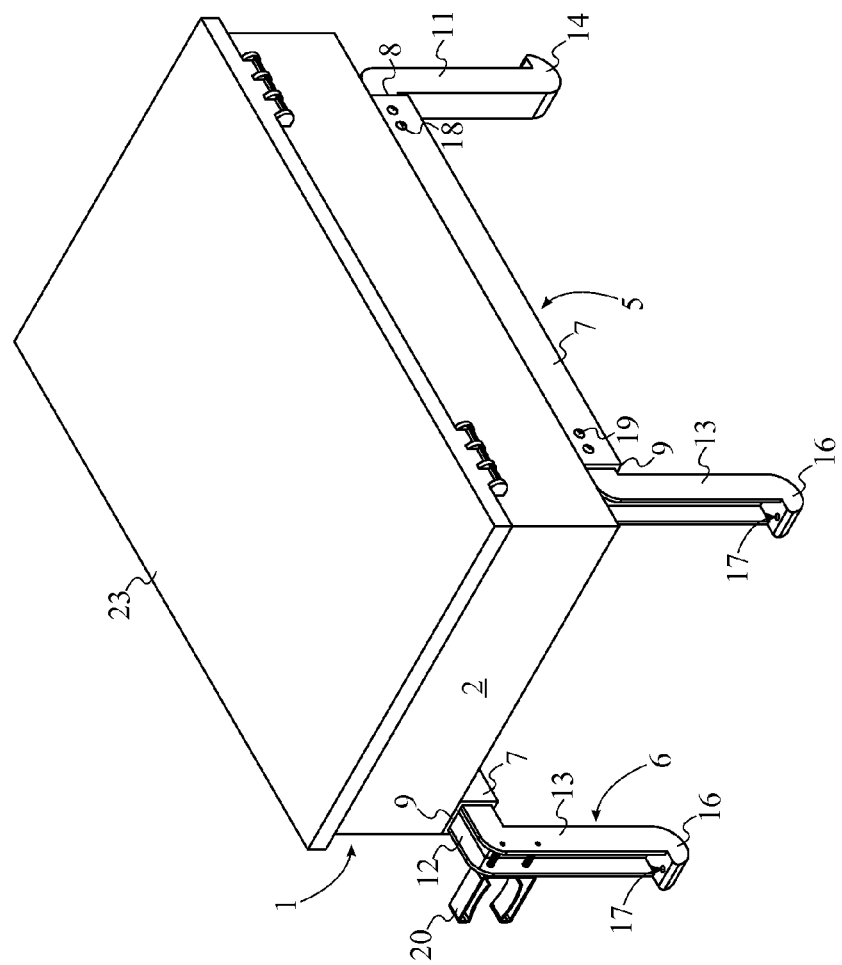
FIG. 2 is an additional top perspective view of the present invention.
Figure 3:
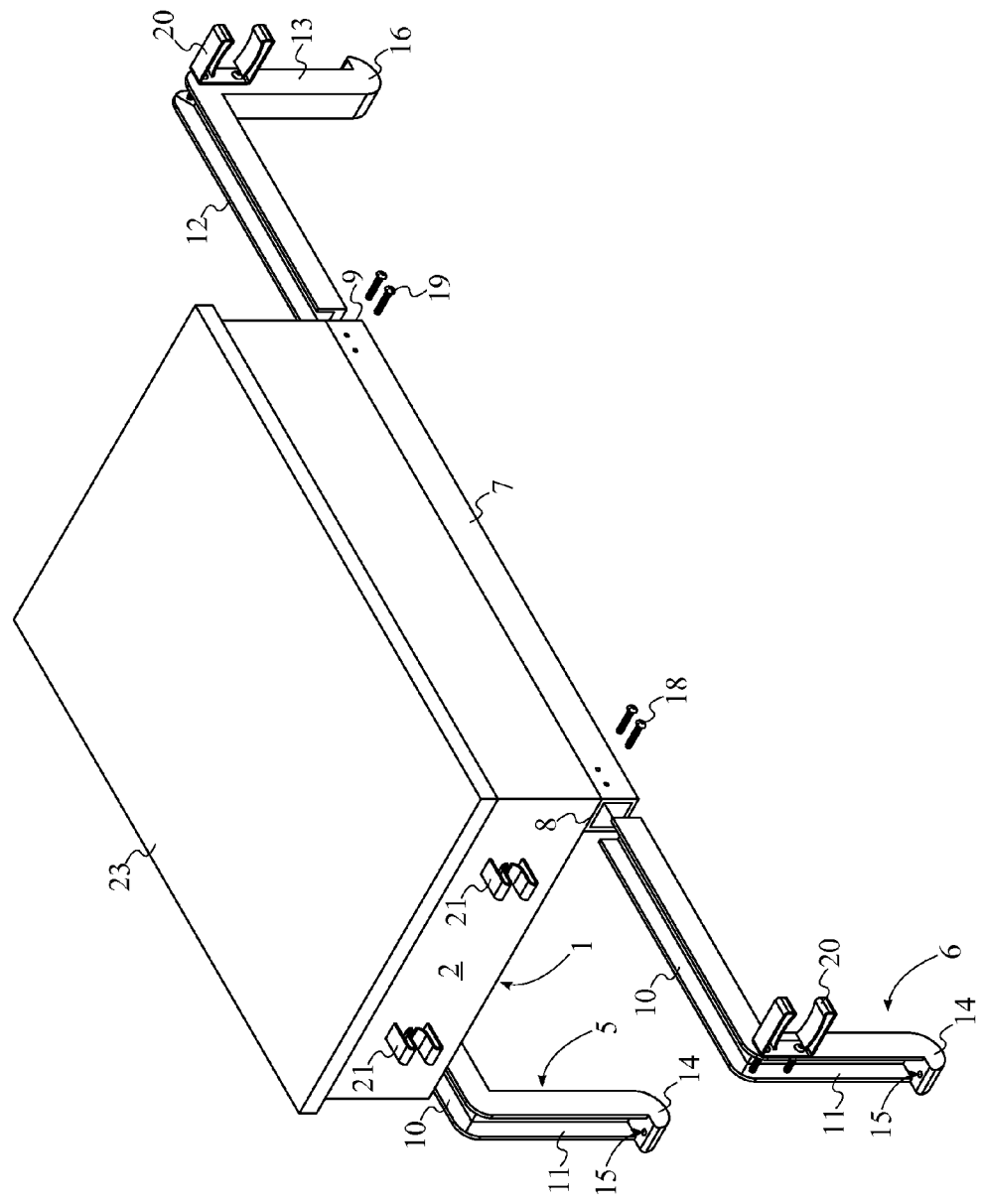
FIG. 3 is an exploded top perspective view of the present invention.
Figure 4:
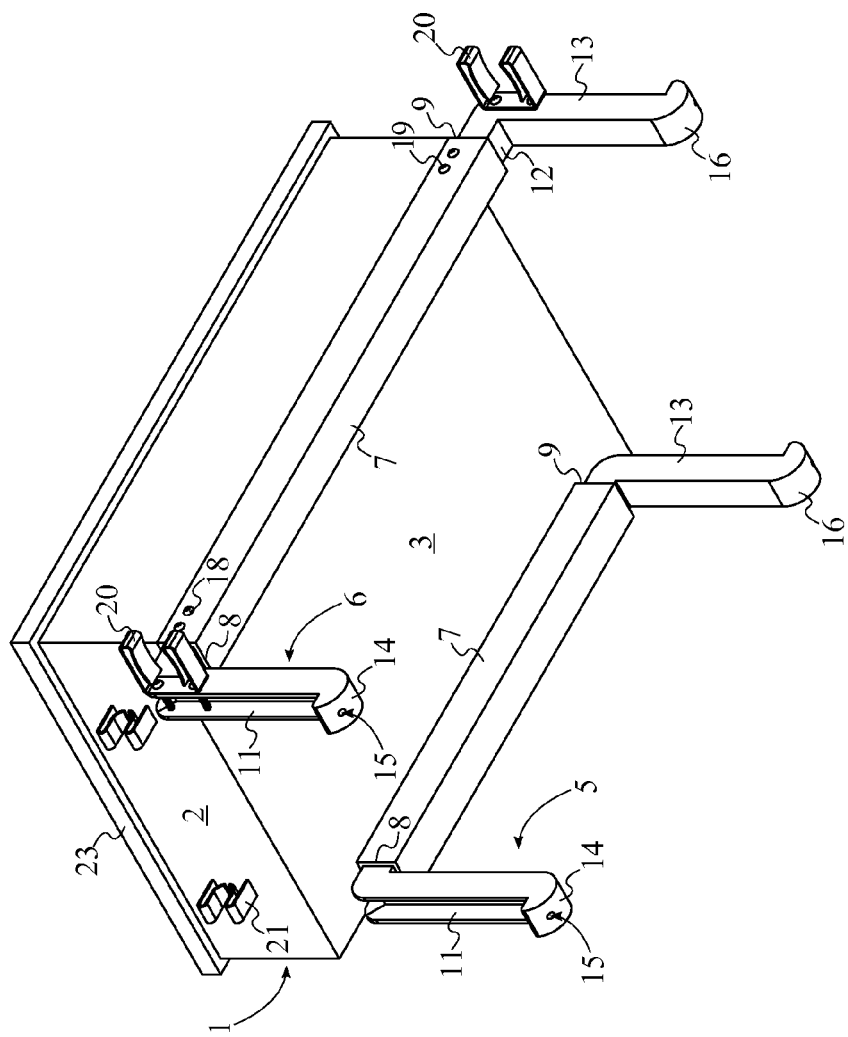
FIG. 4 is a bottom perspective view of the present invention.
Figure 5:
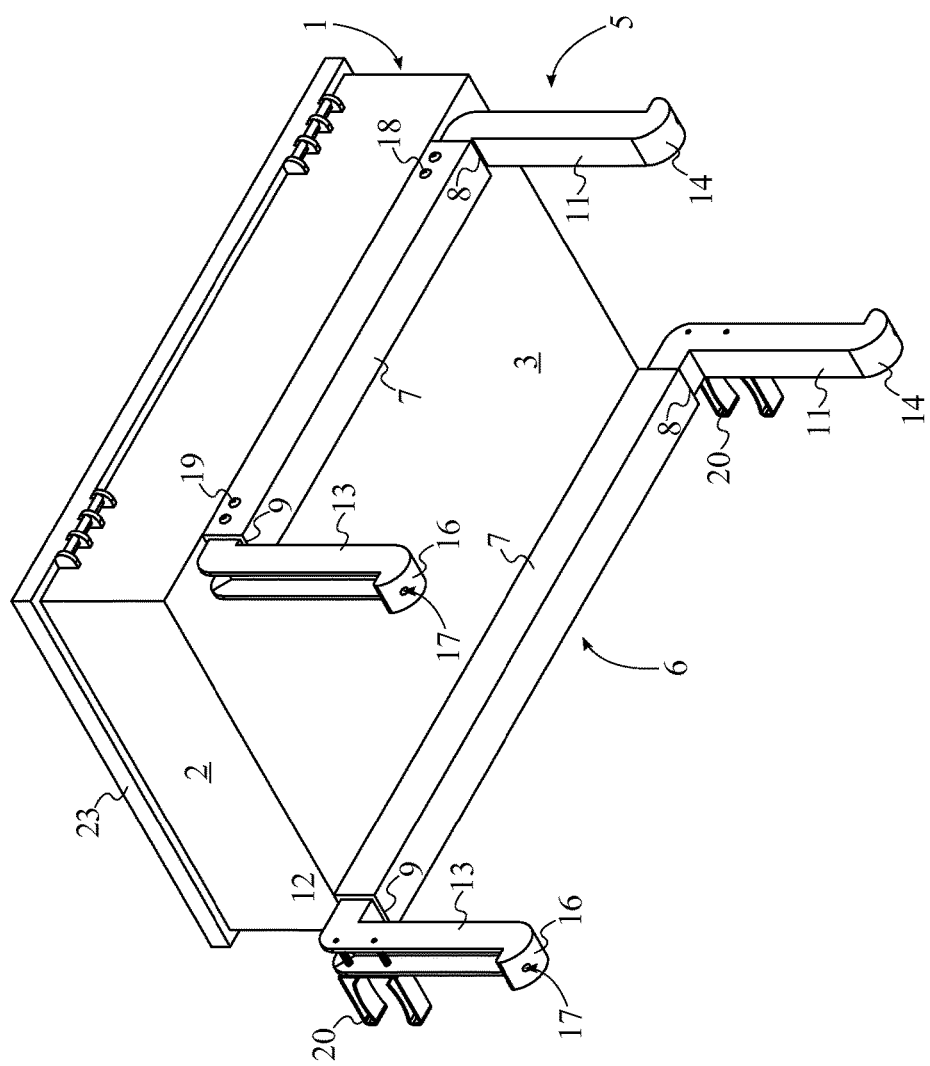
FIG. 5 is an additional bottom perspective view of the present invention.
Figure 6:
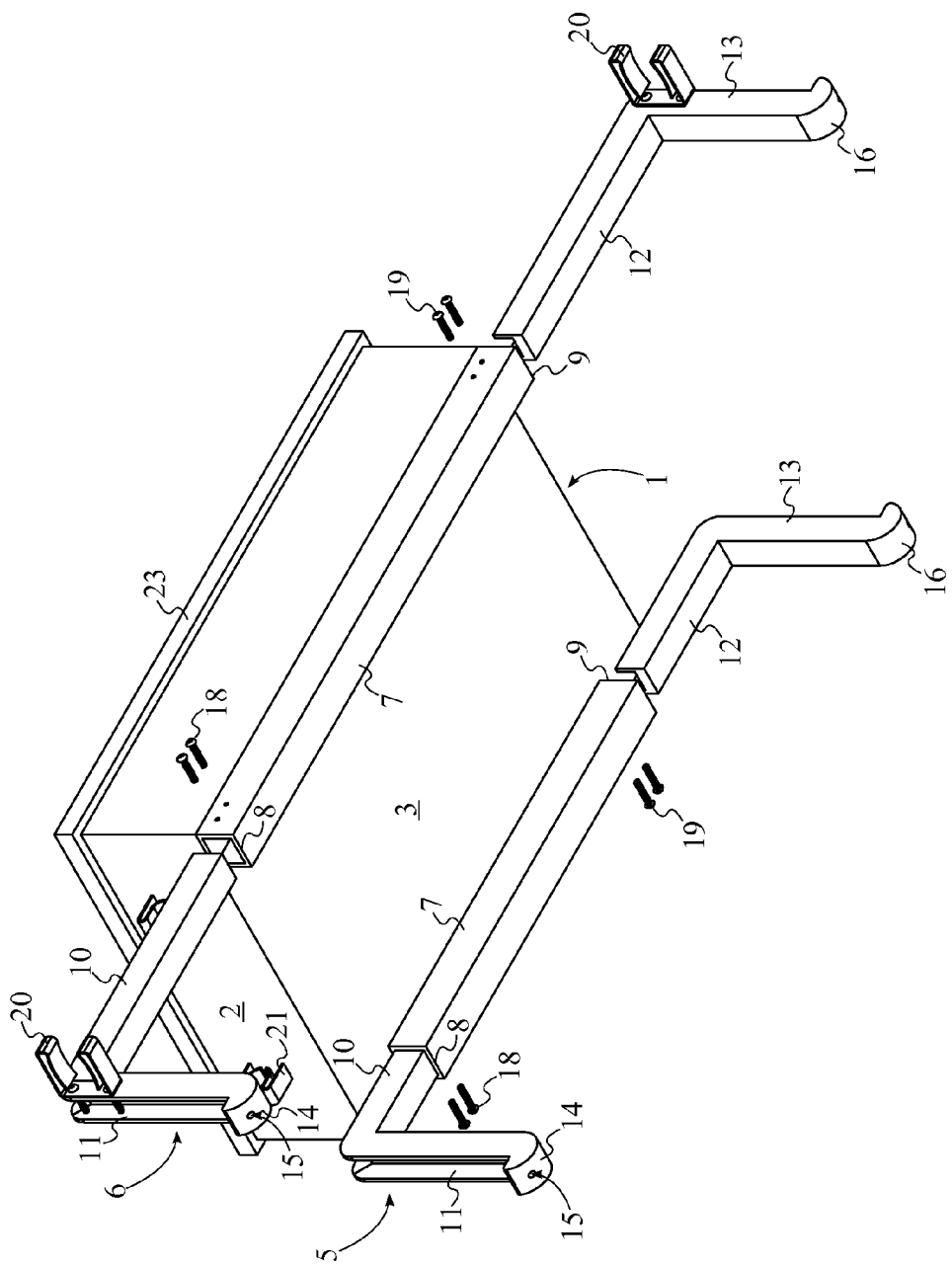
FIG. 6 is an exploded bottom perspective view of the present invention.

All illustrations of the drawings are for the purpose of describing selected versions of the present invention and are not intended to limit the scope of the present invention.

The present invention is a kayak paddle and accessory mounting system that provides the user with a means of securing a paddle and various accessories in place while piloting a kayak. The present invention additionally does not compromise the ability to utilize a kayak spray skirt. The present invention is shown in FIGS. 1-8 and comprises an accessory tray 1, a fore width adjustable support assembly 5, an aft width adjustable support assembly 6, an at least one paddle holder clip 20, and an at least one accessory holder clip 21.

Figure 9:
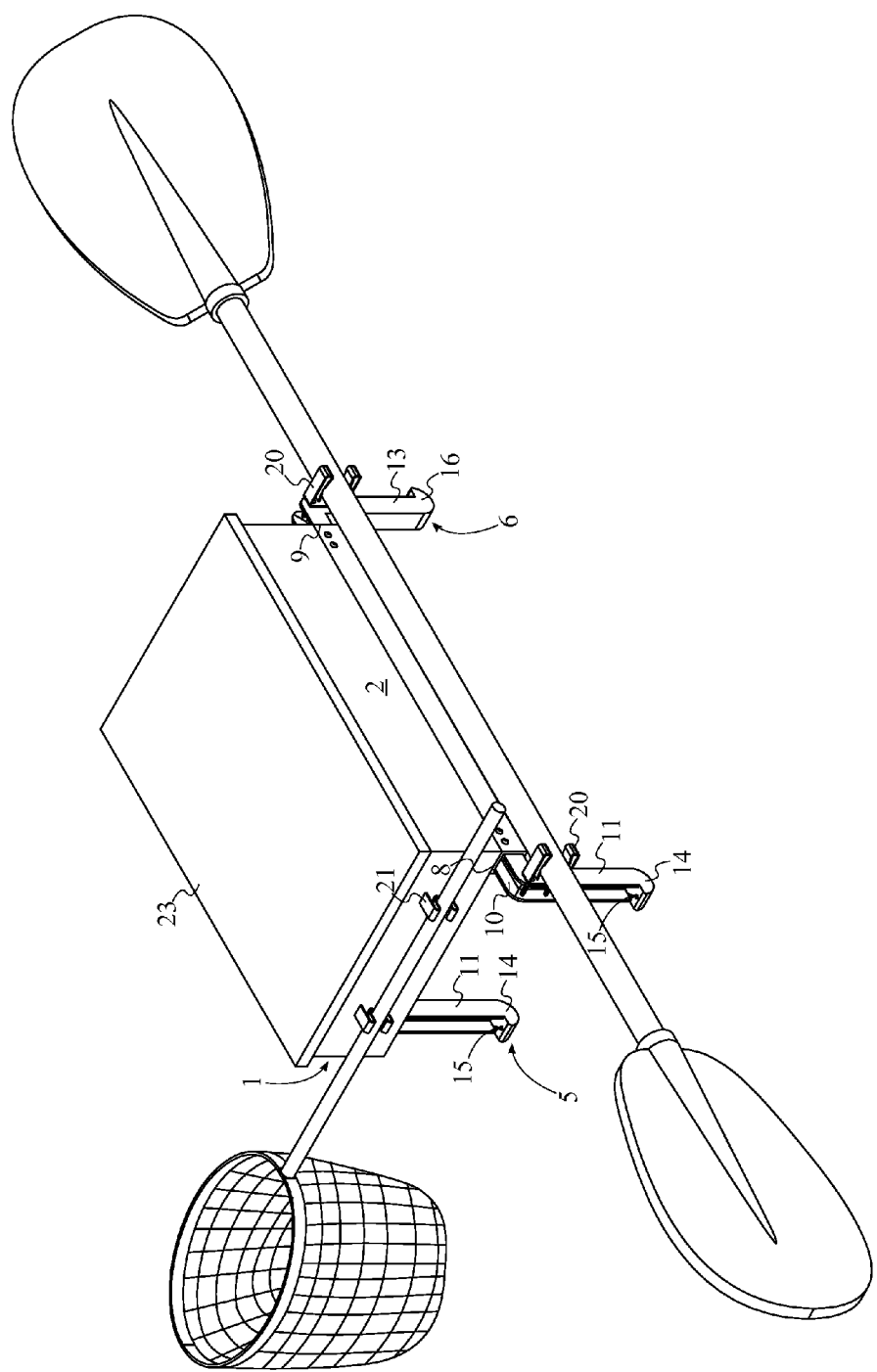
FIG. 9 is a top perspective view of the present invention with a kayak paddle and a fishing net mounted.
Figure 10:
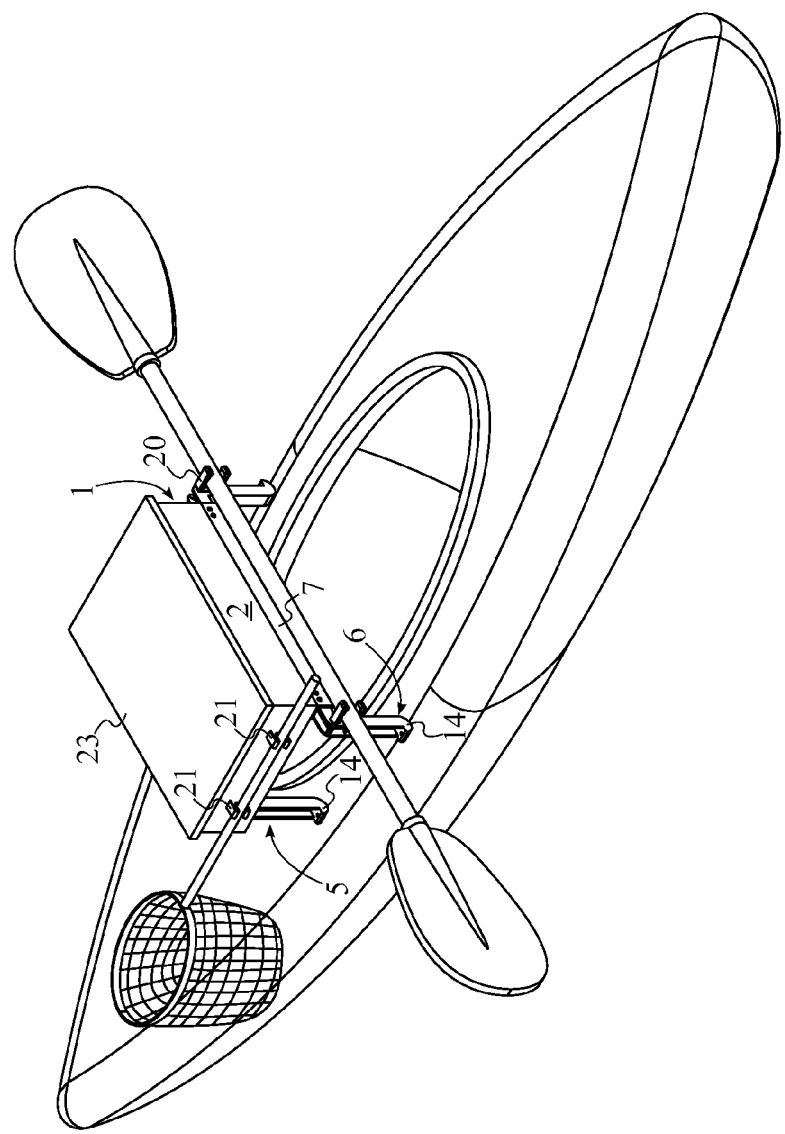
FIG. 10 is a top perspective view of the present invention mounted to a kayak along with a kayak paddle and a fishing net.

The accessory tray 1 is a general purpose container that is capable of stowing a variety of accessories and personal belongings that the user may need while piloting a kayak or while performing other activities. The accessory tray 1 comprises a lateral portion 2 and a tray base 3. The lateral portion 2 is the portion of the accessory tray 1 onto which the at least one accessory holder clip 21 is mounted. As shown in FIG. 9 and FIG. 10, the at least one paddle holder clip 20 allows the user to safely secure a kayak paddle in place on the aft width adjustable support assembly 20. The user may additionally safely secure an additional accessory such as a fishing net in place on the at least one accessory holder clip 21.

With reference to FIGS. 1-6, the fore width adjustable support assembly 5 and the aft width adjustable support assembly 6 are utilized to mount the accessory tray 1 over the cockpit of a kayak. The accessory tray 1 is offset from the cockpit in order to allow a spray skirt to be utilized in conjunction with the present invention. The fore width adjustable support assembly 5 is positioned toward the fore of the kayak while the aft width adjustable support assembly 6 is positioned toward the aft of the kayak. As such, the fore width adjustable support assembly 5 and the aft width adjustable support assembly 6 are positioned opposite to each other across the tray base 3. This provides an additional degree of stability to the accessory tray 1 when mounted over the cockpit. The fore width adjustable support assembly 5 and the aft width adjustable support assembly 6 are connected adjacent to the tray base 3, preventing the accessory tray 1 from separating from the fore width adjustable support assembly 5 and the aft width adjustable support assembly 6 when mounted over the cockpit. The at least one paddle holder clip 20 is mounted to the aft width adjustable support assembly 6 and is oriented away from the fore width adjustable support assembly 5. This places the at least one paddle holder clip 20 into a convenient position for the user when the user wishes to stow the kayak paddle utilizing the at least one paddle holder clip 20. The at least one accessory holder clip 21 is externally mounted to the lateral portion 2 and is oriented perpendicular to the at least one paddle holder clip 20. The perpendicular orientation of the at least one accessory holder clip 21 relative to the at least one paddle holder clip 20 prevents a stowed paddle from physically obstructing or interfering with stowing an accessory.

With further reference to FIGS. 1-6, the fore width adjustable support assembly 5 comprises a base tube 7, a first support rod 10, a first offset rod 11, a second support rod 12, and a second offset rod 13. The base tube 7 is the component into which the first support rod 10 and the second support rod 12 are able to slide and be locked in place. The first offset rod 11 and the second offset rod 13 serve to offset the accessory tray 1 from the kayak when the present invention is mounted to the kayak. The base tube 7 is laterally connected to the tray base 3, providing structural support to the accessory tray 1 when the present invention is mounted to the kayak. The first support rod 10 is telescopically engaged through a first end 8 of the base tube 7 while the second support rod 12 is telescopically engaged through a second end 9 of the base tube 7. This allows the first support rod 10 and the second support rod 12 to be adjusted in order to adjust the width of the fore width adjustable support assembly 5, and as such, the present invention may be adjusted to accommodate various sizes and designs of kayaks. The first offset rod 11 is connected perpendicular to the first support rod 10, opposite to the base tube 7. Similarly, the second offset rod 13 is connected perpendicular to the second support rod 12, opposite to the base tube 7. The first support rod 10 and the second support rod 12 are thus able to slide within the base tube 7 without interference from the first offset rod 11 and the second offset rod 13. The first offset rod 11 and the second offset rod 13 are oriented away from the lateral portion 2, orienting the first offset rod 11 and the second offset rod 13 downward and providing elevation to the accessory tray 1 over the kayak cockpit.

Again referring to FIGS. 1-6, the fore width adjustable support assembly 5 further comprises a first foot 14, a first fastener hole 15, a second foot 16, and a second fastener hole 17. The first foot 14 is placed into contact with the kayak body and provides support for the fore width adjustable support assembly 5 as shown in FIG. 10. The first fastener hole 15 is able to accommodate a fastener when securing the present invention to the kayak. Again with reference to FIGS. 1-6, the first foot 14 is connected perpendicular to the first offset rod 11, opposite to the first support rod 10. The first foot 14 is thus able to serve as a stable base for the first offset rod 11. The first foot 14 is oriented away from the lateral portion 2, providing additional stability for the first offset rod 11. The first fastener hole 15 traverses through the first foot 14, parallel to the first offset rod 11. As such, a fastener may be inserted through the first foot 14 and into the kayak. Much like the first foot 14, the second foot 16 is placed into contact with the kayak body and provides support for the fore width adjustable support assembly 5. The second fastener hole 17 accommodates a fastener when securing the present invention to the kayak. The second foot 16 is connected perpendicular to the second offset rod 13, opposite to the second support rod 12, thus allowing the second foot 16 to serve as a stable base along with the first foot 14. The second foot 16 is oriented away from the lateral portion 2 for stability of the second offset rod 13 when the present invention is mounted to the kayak. The second fastener hole 17 traverses through the second foot 16, parallel to the second offset rod 13. This allows a fastener to be inserted through the second foot 16 and into the kayak.

With reference to FIGS. 1-6, the fore width adjustable support assembly 5 further comprises a first locking clamp 18 and a second locking clamp 19. The first locking clamp 18 and the second locking clamp 19 are utilized to fix the width of the fore width adjustable support assembly 5 to the corresponding kayak to which the present invention is mounted. The first locking clamp 18 is mechanically integrated into the telescopic connection between the first support rod 10 and the base tube 7 while the second locking clamp 19 is mechanically integrated into the telescopic connection between the second support rod 12 and the base tube 7. This allows the first support rod 10 to be locked in place within the base tube 7 through the first locking clamp 18 and the second support rod 12 to be locked in place within the base tube 7 through the second locking clamp 19. The preferred locking mechanism of the first locking clamp 18 and the second locking clamp 19 is via a self-tapping screw, although alternative fasteners or similar mechanisms may be utilized as well.

Again referring to FIGS. 1-6, much like the fore width adjustable support assembly 5, the aft width adjustable support assembly 6 comprises a base tube 7, a first support rod 10, a first offset rod 11, a second support rod 12, and a second offset rod 13. The aft width adjustable support assembly 6 functions in the same manner as the fore width adjustable support assembly 5. The first support rod 10 and the second support rod 12 are able to slide and be locked within the base tube 7 when adjusting and fixing the width of the aft width adjustable support assembly 6. The base tube 7 is laterally connected to the tray base 3 in order to provide structural support to the accessory tray 1 along with the base tube 7 of the fore width adjustable support assembly 5. The first support rod 10 is telescopically engaged through a first end 8 of the base tube 7 while the second support rod 12 is telescopically engaged through a second end 9 of the base tube 7. As such, the first support rod 10 and the second support rod 12 are adjustable in order to set the width of the aft width adjustable support assembly 6. The width of the aft width adjustable support assembly 6 may be adjusted to fit over the cockpit of any kayak. The aft width adjustable support assembly 6 may be adjusted to the appropriate width corresponding to the width of the fore width adjustable support assembly 5 in order to accommodate the specific design of the kayak to which the present invention is mounted. The first offset rod 11 is connected perpendicular to the first support rod 10, opposite to the base tube 7 while the second offset rod 13 is connected perpendicular to the second support rod 12, opposite to the base tube 7. This prevents the first offset rod 11 and the second offset rod 13 from interfering with the first support rod 10 and the second support rod 12 when the first support rod 10 and the second support rod 12 are sliding within the base tube 7. The first offset rod 11 and the second offset rod 13 are oriented away from the lateral portion 2. The first offset rod 11 and the second offset rod 13 of the aft width adjustable support assembly 6 are thus able to provide elevation to the accessory tray 1 over the kayak cockpit in conjunction with the first offset rod 11 and the second offset rod 13 of the fore width adjustable support assembly 5.

Again similar to the fore width adjustable support assembly 5, the aft width adjustable support assembly 6 further comprises a first foot 14, a first fastener hole 15, a second foot 16, and a second fastener hole 17 as shown in FIGS. 1-6. The first foot 14 comes into contact with the kayak body as shown in FIG. 10 in order to provide support for the aft width adjustable support assembly 6. A fastener may be inserted into the first fastener hole 15 when securing the present invention to the kayak. Again with reference to FIGS. 1-6, the first foot 14 is connected perpendicular to the first offset rod 11, opposite to the first support rod 10. The first foot 14 is thus able to serve as a stable base for the first offset rod 11. The first fastener hole 15 traverses through the first foot 14 parallel to the first offset rod 11. This allows a fastener to be inserted through the first foot 14 and into the kayak. The second foot 16 is placed into contact with the kayak body and, along with the first foot 14, provides support for the aft width adjustable support assembly 6. The second foot 16 is connected perpendicular to the second offset rod 13, opposite to the second support rod 12, allowing the second foot 16 to serve as a stable base for the second offset rod 13. The second foot 16 is oriented away from the lateral portion 2, offsetting the second foot 16 away from the accessory tray 1 and increasing stability of the present invention. The second fastener hole 17 traverses through the second foot 16, parallel to the second offset rod 13. A fastener may thus be inserted through the second foot 16 and into the kayak.

As shown in FIGS. 1-6, the aft width adjustable support assembly 6 further comprises a first locking clamp 18 and a second locking clamp 19. Similar to the first locking clamp 18 and the second locking clamp 19 of the fore width adjustable support assembly 5, the first locking clamp 18 and the second locking clamp 19 of the aft width adjustable support assembly 6 are utilized to fix the width of the aft width adjustable support assembly 6 to the kayak. The first locking clamp 18 is mechanically integrated into the telescopic connection between the first support rod 10 and the base tube 7 while the second locking clamp 19 is mechanically integrated into the telescopic connection between the second support rod 12 and the base tube 7. As such, the first support rod 10 is locked in place within the base tube 7 through the first locking clamp 18 while the second support rod 12 is locked in place within the base tube 7 through the second locking clamp 19. As with the fore width adjustable support assembly 5, the preferred locking mechanism of the first locking clamp 18 and the second locking clamp 19 is via a self-tapping screw, although different types of fasteners or similar mechanisms may be utilized as well.

The present invention is designed to facilitate various activities such as fishing while the user is piloting the kayak. In the alternative embodiment of the present invention shown in FIG. 8, the present invention further comprises a fishing rod holder 22. The fishing rod holder 22 is able to secure a fishing rod, leaving the user free to engage in other activities while piloting the kayak. The fishing rod holder 22 is positioned within the accessory tray 1 and is pivotally and removably mounted to the tray base 3. The fishing rod holder 22 is thus stabilized on the tray base 3 within the accessory tray 1. The user is able to adjust the orientation of the fishing rod holder 22 to his or her comfort. Additionally, the user is able to remove the fishing rod holder 22 altogether from the accessory tray 1 to increase storage space within the accessory tray 1.

Figure 7:
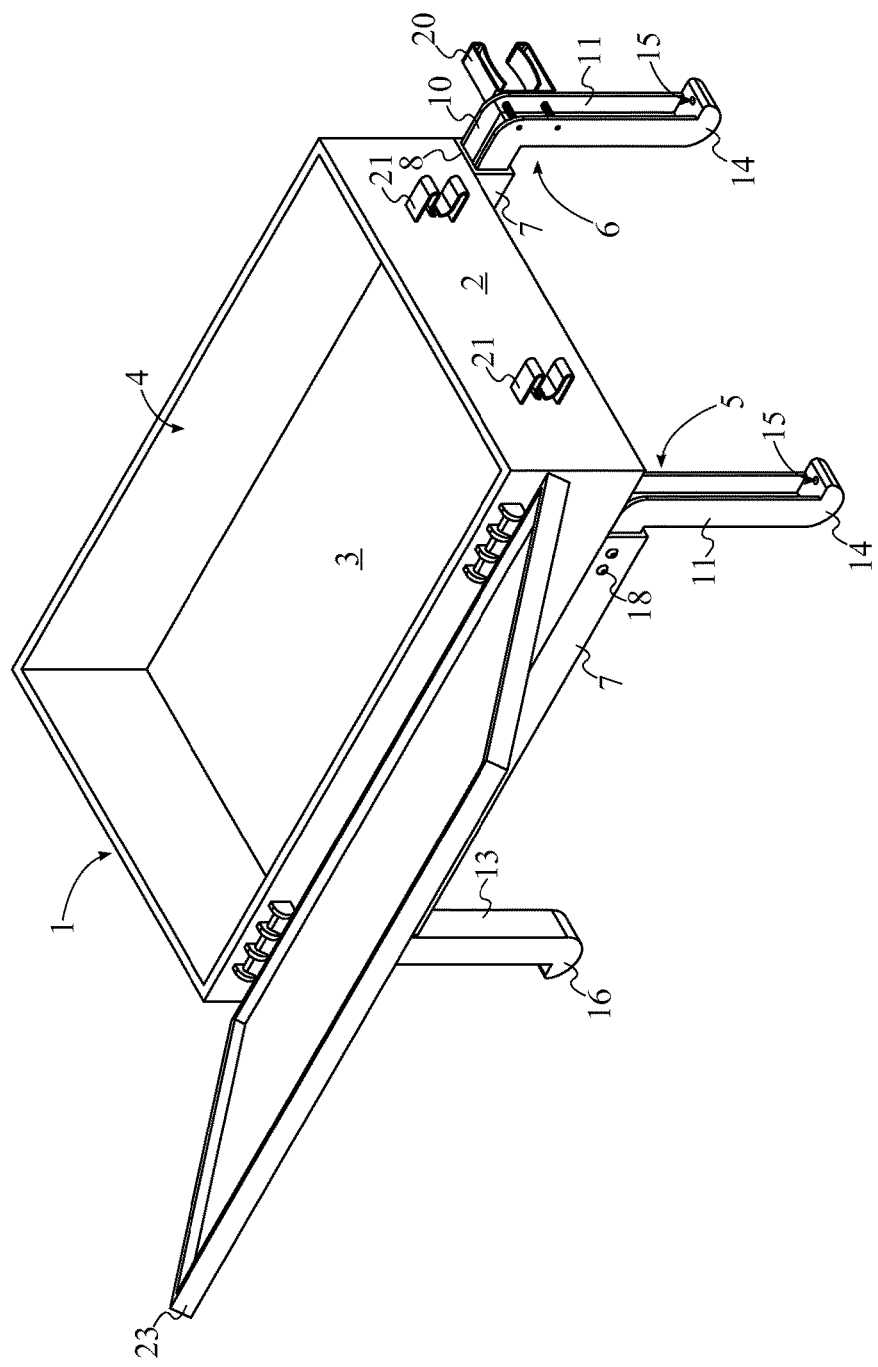
FIG. 7 is a top perspective view of the present invention with the lid open.
Figure 8:
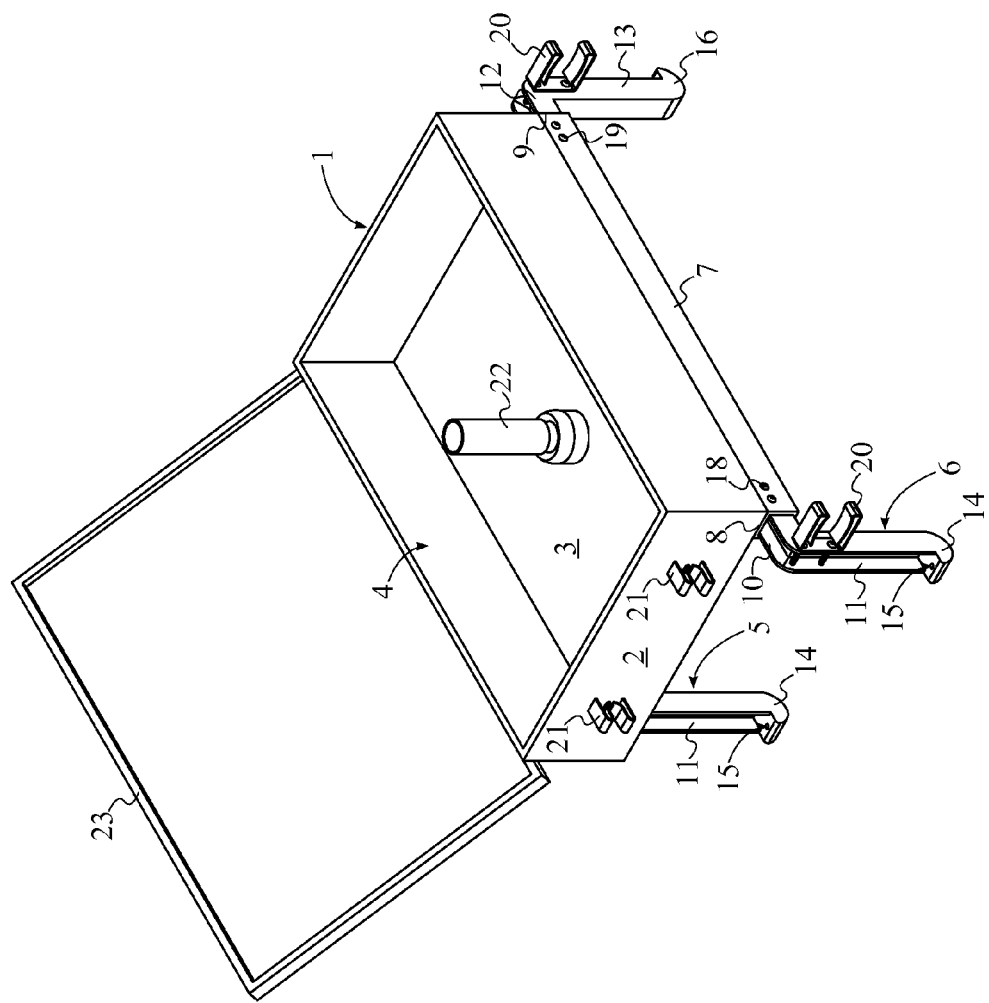
FIG. 8 is a top perspective view of the present invention with the lid open and with the fishing rod holder.

The present invention further comprises a lid 23. The lid 23 provides additional security for accessories and personal belongings that are stored within the accessory tray 1. The accessory tray 1 further comprises a tray opening 4 that provides access into the accessory tray 1. As shown in FIG. 7, the lid 23 is hingedly and removably mounted to the accessory tray 1, adjacent to the tray opening 4. This allows the lid 23 to fully cover the tray opening 4 while allowing the lid 23 to be removed from the accessory tray 1 at the user's discretion.

Although the present invention has been explained in relation to its preferred embodiment, it is understood that many other possible modifications and variations can be made without departing from the spirit and scope of the present invention as hereinafter claimed.

What is claimed is:

1. A kayak paddle and accessory mounting system comprising:
   an accessory tray;
   a fore width adjustable support assembly;
   an aft width adjustable support assembly;
   at least one paddle holder clip;
   at least one accessory holder clip;
   the accessory tray comprising a lateral portion and a tray base;
   the fore width adjustable support assembly and the aft width adjustable support assembly being positioned opposite to each other across the tray base;
   the fore width adjustable support assembly being connected adjacent to the tray base;
   the aft width adjustable support assembly being connected adjacent to the tray base;
   the at least one paddle holder clip being mounted to the aft width adjustable support assembly;
   the at least one paddle holder clip being oriented away from the fore width adjustable support assembly;
   the at least one accessory holder clip being externally mounted to the lateral portion;
   the at least one accessory holder clip being oriented perpendicular to the at least one paddle holder clip;
   the aft width adjustable support assembly comprising a base tube, a first support rod, a first offset rod, a first foot, a second support rod, a second offset rod and a second foot;
   the base tube being laterally connected to the tray base;
   the first support rod being telescopically engaged through a first end of the base tube;
   the first offset rod being connected perpendicular to the first support rod, opposite to the base tube;
   the second support rod being telescopically engaged through a second end of the base tube;
   the second offset rod being connected perpendicular to the second support rod, opposite to the base tube;
   the first offset rod and the second offset rod being oriented away from the lateral portion;
   the first foot being connected perpendicular to first offset rod, opposite to the first support rod;
   the first foot being oriented away from the lateral portion;
   the second foot being connected perpendicular to the second offset rod, opposite to the second support rod;
   the second foot being oriented away from the lateral portion;
   the at least one paddle holder clip comprising a first paddle holder clip and a second paddle holder clip;
   the first paddle holder clip being mounted to the first offset rod; and
   the second paddle holder clip being mounted to the second offset rod.

2. The kayak paddle and accessory mounting system as claimed in claim 1 comprising:
   the fore width adjustable support assembly comprising a base tube, a first support rod, a first offset rod, a second support rod, and a second offset rod;
   the base tube being laterally connected to the tray base;
   the first support rod being telescopically engaged through a first end of the base tube;
   the first offset rod being connected perpendicular to the first support rod, opposite to the base tube;
   the second support rod being telescopically engaged through a second end of the base tube;
   the second offset rod being connected perpendicular to the second support rod, opposite to the base tube; and
   the first offset rod and the second offset rod being oriented away from the lateral portion.

3. The kayak paddle and accessory mounting system as claimed in claim 2 comprising:
   the fore width adjustable support assembly comprising a first foot and a first fastener hole;

the first foot being connected perpendicular to first offset rod, opposite to the first support rod;
the first foot being oriented away from the lateral portion; and
the first fastener hole traversing through the first foot, parallel to the first offset rod.

4. The kayak paddle and accessory mounting system as claimed in claim 2 comprising:
the fore width adjustable support assembly comprising a second foot and a second fastener hole;
the second foot being connected perpendicular to the second offset rod, opposite to the second support rod;
the second foot being oriented away from the lateral portion; and
the second fastener hole traversing through the second foot, parallel to the second offset rod.

5. The kayak paddle and accessory mounting system as claimed in claim 2 comprising:
the fore width adjustable support assembly comprising a first locking clamp and a second locking clamp;
the first locking clamp being mechanically integrated into the telescopic connection between the first support rod and the base tube; and
the second locking clamp being mechanically integrated into the telescopic connection between the second support rod and the base tube.

6. The kayak paddle and accessory mounting system as claimed in claim 1 comprising:
the aft width adjustable support assembly comprising a first fastener hole; and
the first fastener hole traversing through the first foot, parallel to the first offset rod.

7. The kayak paddle and accessory mounting system as claimed in claim 1 comprising:
the aft width adjustable support assembly comprising a second fastener hole; and
the second fastener hole traversing through the second foot, parallel to the second offset rod.

8. The kayak paddle and accessory mounting system as claimed in claim 1 comprising:
the aft width adjustable support assembly comprising a first locking clamp and a second locking clamp;
the first locking clamp being mechanically integrated into the telescopic connection between the first support rod and the base tube; and
the second locking clamp being mechanically integrated into the telescopic connection between the second support rod and the base tube.

9. The kayak paddle and accessory mounting system as claimed in claim 1 comprising:
a fishing rod holder;
the fishing rod holder being positioned within the accessory tray; and
the fishing rod holder being pivotally and removably mounted to the tray base.

10. The kayak paddle and accessory mounting system as claimed in claim 1 comprising:
a lid;
the accessory tray comprising a tray opening; and
the lid being hingedly mounted to the accessory tray, adjacent to the tray opening.

11. A kayak paddle and accessory mounting system comprising:
an accessory tray;
a fore width adjustable support assembly;
an aft width adjustable support assembly;
at least one paddle holder clip;
at least one accessory holder clip;
a fishing rod holder;
a lid;
the accessory tray comprising a lateral portion, a tray base, and a tray opening;
the fore width adjustable support assembly and the aft width adjustable support assembly being positioned opposite to each other across the tray base;
the fore width adjustable support assembly being connected adjacent to the tray base;
the aft width adjustable support assembly being connected adjacent to the tray base;
the at least one paddle holder clip being mounted to the aft width adjustable support assembly;
the at least one paddle holder clip being oriented away from the fore width adjustable support assembly;
the at least one accessory holder clip being externally mounted to the lateral portion;
the at least one accessory holder clip being oriented perpendicular to the at least one paddle holder clip;
the fishing rod holder being positioned within the accessory tray;
the fishing rod holder being pivotally and removably mounted to the tray base;
the lid being hingedly mounted to the accessory tray, adjacent to the tray opening;
the aft width adjustable support assembly comprising a base tube, a first support rod, a first offset rod, a first foot, a second support rod, a second offset rod and a second foot;
the base tube being laterally connected to the tray base;
the first support rod being telescopically engaged through a first end of the base tube;
the first offset rod being connected perpendicular to the first support rod, opposite to the base tube;
the second support rod being telescopically engaged through a second end of the base tube;
the second offset rod being connected perpendicular to the second support rod, opposite to the base tube;
the first offset rod and the second offset rod being oriented away from the lateral portion;
the first foot being connected perpendicular to first offset rod, opposite to the first support rod;
the first foot being oriented away from the lateral portion;
the second foot being connected perpendicular to the second offset rod, opposite to the second support rod;
the second foot being oriented away from the lateral portion;
the first paddle holder clip being mounted to the first offset rod; and
the second paddle holder clip being mounted to the second offset rod.

12. The kayak paddle and accessory mounting system as claimed in claim 11 comprising:
the fore width adjustable support assembly comprising a base tube, a first support rod, a first offset rod, a second support rod, and a second offset rod;
the base tube being laterally connected to the tray base;
the first support rod being telescopically engaged through a first end of the base tube;
the first offset rod being connected perpendicular to the first support rod, opposite to the base tube;
the second support rod being telescopically engaged through a second end of the base tube;
the second offset rod being connected perpendicular to the second support rod, opposite to the base tube; and the first offset rod and the second offset rod being oriented away from the lateral portion.

13. The kayak paddle and accessory mounting system as claimed in claim 12 comprising:

the fore width adjustable support assembly comprising a first foot and a first fastener hole;

the first foot being connected perpendicular to first offset rod, opposite to the first support rod;

the first foot being oriented away from the lateral portion; and the first fastener hole traversing through the first foot, parallel to the first offset rod.

14. The kayak paddle and accessory mounting system as claimed in claim 12 comprising:

the fore width adjustable support assembly comprising a second foot and a second fastener hole;

the second foot being connected perpendicular to the second offset rod, opposite to the second support rod;

the second foot being oriented away from the lateral portion; and the second fastener hole traversing through the second foot, parallel to the second offset rod.

15. The kayak paddle and accessory mounting system as claimed in claim 12 comprising:

the fore width adjustable support assembly comprising a first locking clamp and a second locking clamp;

the first locking clamp being mechanically integrated into the telescopic connection between the first support rod and the base tube; and the second locking clamp being mechanically integrated into the telescopic connection between the second support rod and the base tube.

16. The kayak paddle and accessory mounting system as claimed in claim 11 comprising:

the aft width adjustable support assembly comprising a first fastener hole; and the first fastener hole traversing through the first foot, parallel to the first offset rod.

17. The kayak paddle and accessory mounting system as claimed in claim 11 comprising:

the aft width adjustable support assembly comprising a second fastener hole; and the second fastener hole traversing through the second foot, parallel to the second offset rod.

18. The kayak paddle and accessory mounting system as claimed in claim 11 comprising:

the aft width adjustable support assembly comprising a first locking clamp and a second locking clamp;

the first locking clamp being mechanically integrated into the telescopic connection between the first support rod and the base tube; and the second locking clamp being mechanically integrated into the telescopic connection between the second support rod and the base tube.

* * * * *